US012681517B2

(12) United States Patent
Rego et al.

(10) Patent No.: US 12,681,517 B2
(45) Date of Patent: Jul. 14, 2026

(54) LOW DROPOUT VOLTAGE REGULATOR INCLUDING POWER SUPPLY NOISE SUPPRESSION CIRCUIT

(71) Applicant: QUALCOMM Incorporated, San Diego, CA (US)

(72) Inventors: Ashwith Jerome Rego, Bangalore (IN); Raghav Gupta, Bangalore (IN); Burcin Serter Ergun, Poway, CA (US); Sajin Mohamad, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 171 days.

(21) Appl. No.: 18/765,843

(22) Filed: Jul. 8, 2024

(65) Prior Publication Data

US 2026/0050280 A1 Feb. 19, 2026

(51) Int. Cl.
*G05F 1/56* (2006.01)
*G05F 1/575* (2006.01)

(52) U.S. Cl.
CPC ................ *G05F 1/56* (2013.01); *G05F 1/575* (2013.01)

(58) Field of Classification Search
CPC ... G05F 1/445; G05F 1/45; G05F 1/56; G05F 1/59; G05F 1/62; G05F 1/565; G05F 1/575
See application file for complete search history.

(56) References Cited

U.S. PATENT DOCUMENTS 5,929,692 A 7/1999 Carsten
9,577,508 B2 2/2017 Wang
10,879,851 B2 12/2020 Ghanevati et al.
2014/0340058 A1* 11/2014 Wang ...................... H02M 1/15 323/268
2017/0019017 A1 1/2017 Hawley
2019/0317536 A1* 10/2019 Liu ......................... G05F 1/467
2023/0152831 A1* 5/2023 Chang ..................... G05F 1/461 327/540
2023/0409065 A1* 12/2023 Feng ......................... G05F 1/59
2024/0275348 A1* 8/2024 Vigilante ................ H03F 1/301

FOREIGN PATENT DOCUMENTS

CN 104317349 B 3/2016
CN 112327988 B 1/2022

OTHER PUBLICATIONS

"A Low Dropout Voltage Regulator with a Supply Ripple Cancellation Technique", Electrical and Computer Engineering, Jul. 2023, 89 Pages.
Chyan T.Y., et al., "Evaluation and Perspective of Analog Low-Dropout Voltage Regulators: A Review", IEEE Access, Oct. 28, 2022, vol. 10, pp. 114469-114489.

* cited by examiner

*Primary Examiner* — Alex Torres-Rivera
(74) *Attorney, Agent, or Firm* — Loza & Loza, LLP

(57) ABSTRACT

An apparatus, including: an upper voltage rail; a lower voltage rail; a low dropout (LDO) voltage regulator configured to generate a regulated output voltage at an output coupled between the upper voltage rail and the lower voltage rail while transferring noise from the upper voltage rail to the output; and an auxiliary noise suppression circuit configured to transfer noise from the upper voltage rail to the output of the LDO voltage regulator with a phase substantially opposite to a phase of the noise transferred to the output by the LDO voltage regulator such that noise suppression or reduction occurs at the output of the LDO voltage regulator.

11 Claims, 7 Drawing Sheets

LOW DROPOUT VOLTAGE REGULATOR INCLUDING POWER SUPPLY NOISE SUPPRESSION CIRCUIT

FIELD

This disclosure relates generally to voltage regulators, and in particular, to a low dropout (LDO) voltage regulator including an auxiliary power supply noise suppression circuit.

BACKGROUND

Low dropout (LDO) voltage regulators are used in many applications to provide a regulated output voltage for supplying power to many different types of circuits. The LDO voltage regulator generates the regulated output voltage from a supply voltage on a power or voltage rail. Often, the power rail supply voltage has significant noise, as it may also be coupled to or affected by other circuits performing high speed, current-demanding operations. Such high speed, current-demanding operations generate high frequency noise on the power rail, which may couple into the output of an LDO voltage regulator. This may have the negative consequences of degrading the performance of circuits to which the LDO voltage regulator supplies the regulated output voltage.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to an apparatus. The apparatus, includes: an upper voltage rail; a lower voltage rail; a low dropout (LDO) voltage regulator configured to generate a regulated output voltage at an output coupled between the upper voltage rail and the lower voltage rail while transferring noise from the upper voltage rail to the output; and an auxiliary noise suppression circuit configured to transfer noise from the upper voltage rail to the output of the LDO voltage regulator with a phase substantially opposite to a phase of the noise transferred to the output by the LDO voltage regulator such that noise suppression or reduction occurs at the output of the LDO voltage regulator.

Another aspect of the disclosure relates to an apparatus. The apparatus, includes: an upper voltage rail; a lower voltage rail; a low dropout (LDO) voltage regulator configured to generate a regulated output voltage at an output coupled between the upper voltage rail and the lower voltage rail while transferring noise from the upper voltage rail to the output; and an auxiliary noise suppression circuit configured to transfer noise from the upper voltage rail to the output of the LDO voltage regulator such that noise suppression or reduction occurs at the output of the LDO voltage regulator.

Another aspect of the disclosure relates to a method. The method includes generating a regulated output voltage at an output while transferring noise from a voltage rail to the output via a first path; and transferring noise from the voltage rail to the output via a second path with a phase substantially opposite to a phase of the noise transferred to the output via the first path.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. The term "substantially" means that the associated parameter may not be exact as indicated but accounts for some variation due to specified tolerances.

Figure 1:
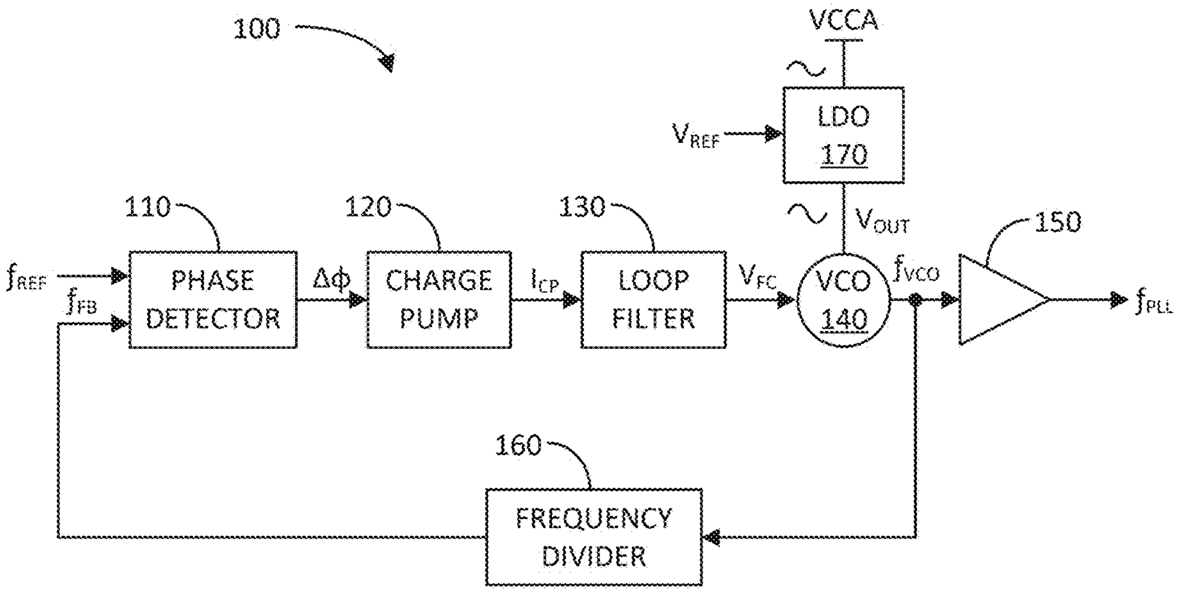
FIG. 1 illustrates a block diagram of an example phase locked loop (PLL) in accordance with an aspect of the disclosure.

FIG. 1 illustrates a block diagram of an example phase locked loop (PLL) 100 in accordance with an aspect of the disclosure. The PLL 100 serves as an example to which a low dropout (LDO) voltage regulator provides a regulated output voltage. It shall be understood that the LDO voltage regulators described herein may provide regulated output voltages to many different types of circuits. The PLL 100 includes a phase detector 110, a charge pump 120, a loop filter 130, a voltage controlled oscillator 140, a buffer 150, and a frequency divider 160. Additionally, and of particular interest, the PLL includes a low dropout (LDO) voltage regulator 170.

The phase detector 110 is configured to generate a phase error signal $\Delta\phi$ based on a phase difference between a reference clock signal $f_{REF}$ and a feedback clock signal $f_{FB}$. The charge pump 120 is configured to generate a current signal $I_{CP}$ based on the phase error signal $\Delta\phi$. The loop filter 130 is configured to filter (e.g., low pass filter) the current signal $I_{IC}$ to generate a frequency-control voltage signal $V_{FC}$ for the VCO 140. The VCO 140 is configured to generate a VCO clock signal $f_{VCO}$ whose frequency is controlled by the frequency-control voltage signal $V_{FC}$. The frequency divider 160 is configured to frequency divider the VCO clock signal $f_{VCO}$ to generate the feedback clock signal $f_{FB}$. The buffer 150 is configured to buffer the VCO clock signal $f_{VCO}$ to generate an output clock $f_{PLL}$ of the PLL 100.

As shown, the LDO voltage regulator 170 is coupled between a power or voltage rail VCCA and the VCO 140. The LDO voltage regulator 170 is configured to generate a regulated supply voltage $V_{OUT}$ for supplying power to the VCO 140. The LDO voltage regulator 170 may generate the regulated supply voltage $V_{OUT}$ based on a substantially temperature-stable reference voltage $V_{REF}$ (e.g., a bandgap voltage).

As previously discussed, the power rail VCCA may supply power, not only to the PLL 100, but may also supply power to other circuits. In such configuration, the operations of the other circuits coupled to the power rail VCCA typically produce noise on the power rail, as represented by a wavy noise symbol shown proximate the power rail VCCA in FIG. 1. The LDO voltage regulator 170 may filter out some of that power supply noise if it is within the regulation bandwidth of the LDO voltage regulator 170. However, as the other circuits coupled to the power rail VCCA may be performing high speed, current-demanding operations, the noise on the power rail VCCA may have frequencies higher than the regulation bandwidth of the LDO voltage regulator 170.

As a consequence, the high frequency noise couples into the output of the LDO voltage regulator 170, which may adversely impact the operation of the VCO 140. In particular, the noise at the output of the LDO voltage regulator 170 may increase the phase noise of the VCO clock signal $f_{VCO}$ and all other clock signals $f_{FB}$ and $f_{PLL}$ derived therefrom. Accordingly, there is a need to reduce the noise at the output of the LDO voltage regulator 170 to improve the performance of circuits that receive power from the LDO voltage regulator 170.

Figure 2:
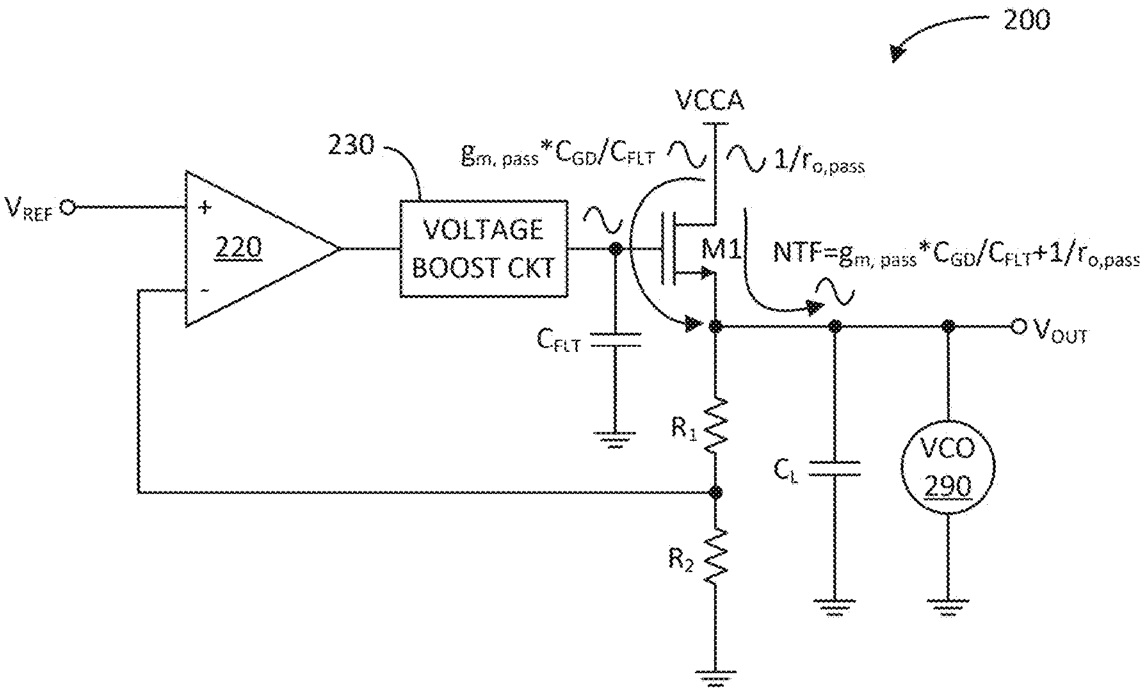
FIG. 2 illustrates a block diagram of an example low dropout (LDO) voltage regulator in accordance with another aspect of the disclosure.

FIG. 2 illustrates a block diagram of an example low dropout (LDO) voltage regulator 200 in accordance with another aspect of the disclosure. The LDO voltage regulator 200 includes a differential amplifier 220, an optional voltage boost (e.g., charge pump (CP) based) circuit 230, a field effect transistor (FET) M1 (e.g., an n-channel FET (NFET)), an optional voltage divider feedback circuit including resistors $R_1$ and $R_2$, and an output capacitor $C_L$. As shown, for explanation purposes, a voltage controlled oscillator (VCO) 290, serving as an example load for the LDO voltage regulator 200, is coupled between the output of the LDO voltage regulator 200 and a lower voltage rail (e.g., ground).

The differential amplifier 220, which may receive power via an upper voltage rail VCCA and the lower voltage rail, includes a first (e.g., positive) input configured to receive a reference voltage $V_{REF}$, which may be a substantially temperature-stable reference voltage, such as a bandgap voltage. The FET M1 includes a gate coupled to an output of the differential amplifier 220 directly or via the optional voltage boost circuit 230. The optional voltage boost circuit 230 may be required if the regulated output voltage $V_{OUT}$ of the LDO voltage regulator 200 is relatively close to the supply voltage at the upper voltage rail VCCA. Accordingly, the optional voltage boost circuit 230 boosts a voltage generated at the output of the differential amplifier 220 to generate a gate voltage suitable for operating the FET M1 in saturation region for voltage regulation purposes. Otherwise, if the regulated output voltage $V_{OUT}$ of the LDO voltage regulator 200 is significantly lower than the supply voltage at the upper voltage rail VCCA, the optional voltage boost circuit 230 may not be needed.

The FET M1 is coupled in series with the first and second resistors $R_1$ and $R_2$ between the upper voltage rail VCCA and the lower voltage rail. That is, the drain of FET M1 is coupled to the upper voltage rail VCCA. The first resistor $R_1$ is coupled between the source of FET M1 and the second resistor $R_2$. The second resistor $R_2$ is coupled between the first resistor $R_1$ and the lower voltage rail. A node between the first and second resistors $R_1$ and $R_2$, serving as a feedback node, is coupled to a second (e.g., negative) input of the differential amplifier 220. The LDO voltage regulator 200 includes an output at the node between the FET M1 and the resistor $R_1$. The load capacitor $C_L$, as well as the VCO 290, may be coupled between the output of the LDO voltage regulator 200 and the lower voltage rail. In this configuration, the regulated output voltage $V_{OUT}$ of the LDO voltage regulator 200 may be approximated in accordance with the following expression: $V_{OUT}=(1+R_1/R_2)*V_{REF}$.

As previously mentioned, the voltage divider including $R_1$ and $R_2$ is optional and may not be needed, for example, if the output voltage $V_{OUT}$ of the LDO voltage regulator 200 is within an input common mode range of the differential amplifier 220. In such case, the output of the LDO voltage regulator 200 may be coupled directly to the second input (e.g., negative) of the differential amplifier 220, where $V_{OUT}=V_{REF}$.

As illustrated, noise (e.g., high frequency noise beyond the regulation bandwidth of the LDO voltage regulator 200, represented as wavy lines) may couple from the upper voltage rail VCCA into the output of the LDO voltage regulator 200 via the gate-to-drain capacitance CGD of the FET M1 where the FET M1 operates as a source follower, and the output resistance $r_{o,pass}$ of the FET M1. For example, in the current domain, the voltage-to-current noise transfer function ($NTF_1$) associated with the gate-to-drain capacitance CGD may be approximated or modeled as $g_{m,pass}*C_{GD}/C_{FLT}$ (e.g., where $C_{FLT}>>C_{GD}$, otherwise, it would be $g_{m,pass}*C_{GD}/(C_{GD}+C_{FLT})$), where $g_{m,pass}$ is the transconductance gain of the FET M1 and $C_{FLT}$ is the capacitance of a filter capacitor $C_{FLT}$ coupled between the gate of the FET M1 and the lower voltage rail. Similarly, in the current domain, the voltage-to-current noise transfer function ($NTF_2$) associated with the output resistance $r_{o,pass}$ of the FET M1 may be approximated or modeled as $1/r_{o,pass}$. Thus, the total voltage-to-current NTF between the upper voltage rail VCCA and the output of the LDO voltage regulator 200 may be modeled or approximated in accordance with the following expression: $NTF_L=g_{m,pass}*C_{GD}/C_{FLT}+1/r_{o,pass}$.

The ability of the LDO voltage regulator 200 to suppress power supply noise may be quantified by its power supply rejection ratio (PSRR). The PSRR of an LDO voltage regulator may be defined as the 20 $\log_{10}$ of the ratio of the change in the supply voltage at the upper voltage rail VCCA (for case of explanation, the supply voltage is also referred to herein as VCCA) to the corresponding change in the output voltage $V_{OUT}$ of the LDO voltage regulator 200. The higher PSRR of an LDO voltage regulator, the better is its ability to suppress power supply noise from its output. Accordingly, the following describes various implementations of example high PSRR LDO voltage regulators, wherein "high PSRR" means that the LDO voltage regulators have auxiliary noise suppression circuits.

Figure 3:
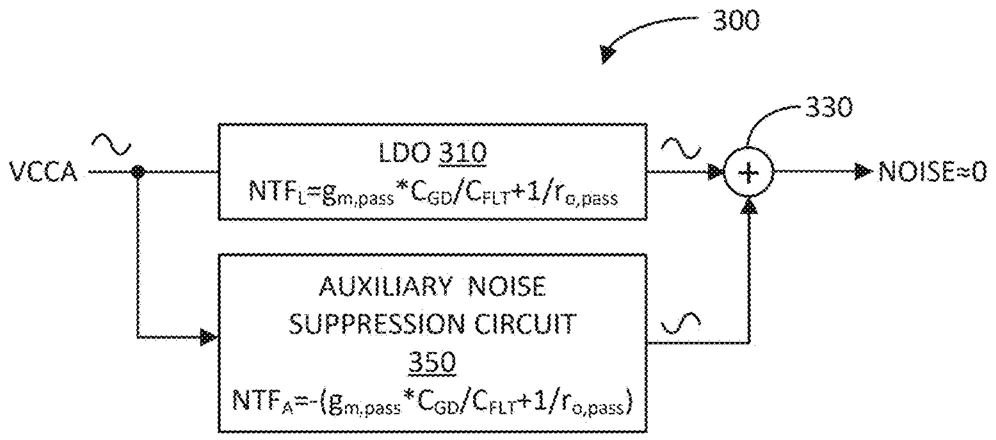
FIG. 3 illustrates a block diagram of an example high power supply rejection ratio (PSRR) low dropout (LDO) voltage regulator in accordance with another aspect of the disclosure.

FIG. 3 illustrates a block diagram of an example high power supply rejection ratio (PSRR) low dropout (LDO) voltage regulator 300 in accordance with another aspect of the disclosure. The high PSRR LDO voltage regulator 300 includes an LDO voltage regulator 310, such as the LDO voltage regulator 200 previously discussed. The LDO voltage regulator 310 may be coupled between a voltage rail VCCA and an output 330, represented as a summing node as discussed further herein. As previously discussed, for frequencies above its regulation bandwidth, the LDO voltage regulator 310 may have a voltage-to-current noise transfer function ($NTF_L$) modeled or approximated in accordance with the following expression: $NTF_L=g_{m,pass}*C_{GD}/C_{FLT}+1/r_{o,pass}$ between the voltage rail VCCA and the output 330.

The high PSRR LDO voltage regulator 300 further includes an auxiliary power supply noise suppression circuit 350 coupled between the voltage rail VCCA and the output 330 of the high PSRR LDO voltage regulator 300. The auxiliary noise suppression circuit 350 is configured to have a voltage-to-current noise transfer function ($NTF_A$) that has substantially the opposite (or inverse) phase or negative of the $NTF_L$ of the LDO voltage regulator 310 (e.g., $NTF_A=-NTF_L=-(g_{m,pass}*C_{GD}/C_{FLT}+1/r_{o,pass})$). Accordingly, in the current domain, the respective noise contributions from the LDO voltage regulator 310 and the auxiliary noise suppression circuit 350 sum at the output 330 of the high PSRR LDO voltage regulator 300, where noise suppression or reduction occurs: e.g., noise at output$=NTF_L+NTF_A=NTF_L-NTF_L\approx$zero (0).

In this example, the $NTF_A$ of the auxiliary noise suppression circuit 350 has substantially the opposite phase or negative of the $NTF_L$ of the LDO voltage regulator 310, and the output node 330 sums the noise contributions of the auxiliary noise suppression circuit 350 and the LDO voltage regulator 310. However, equivalently, the $NTF_A$ of the auxiliary noise suppression circuit 350 may have substantially the same phase as the phase of the $NTF_L$ as the LDO voltage regulator 310 (e.g., $NTF_A\approx NTF_L$), where the output node may be configured to subtract the noise contributions of the auxiliary noise suppression circuit 350 from the LDO voltage regulator 310 to effectuate noise suppression or reduction. Other than processing power supply noise for noise suppression or reduction purposes, the auxiliary noise suppression circuit 350 may not process any non-noise signal.

Figure 4:
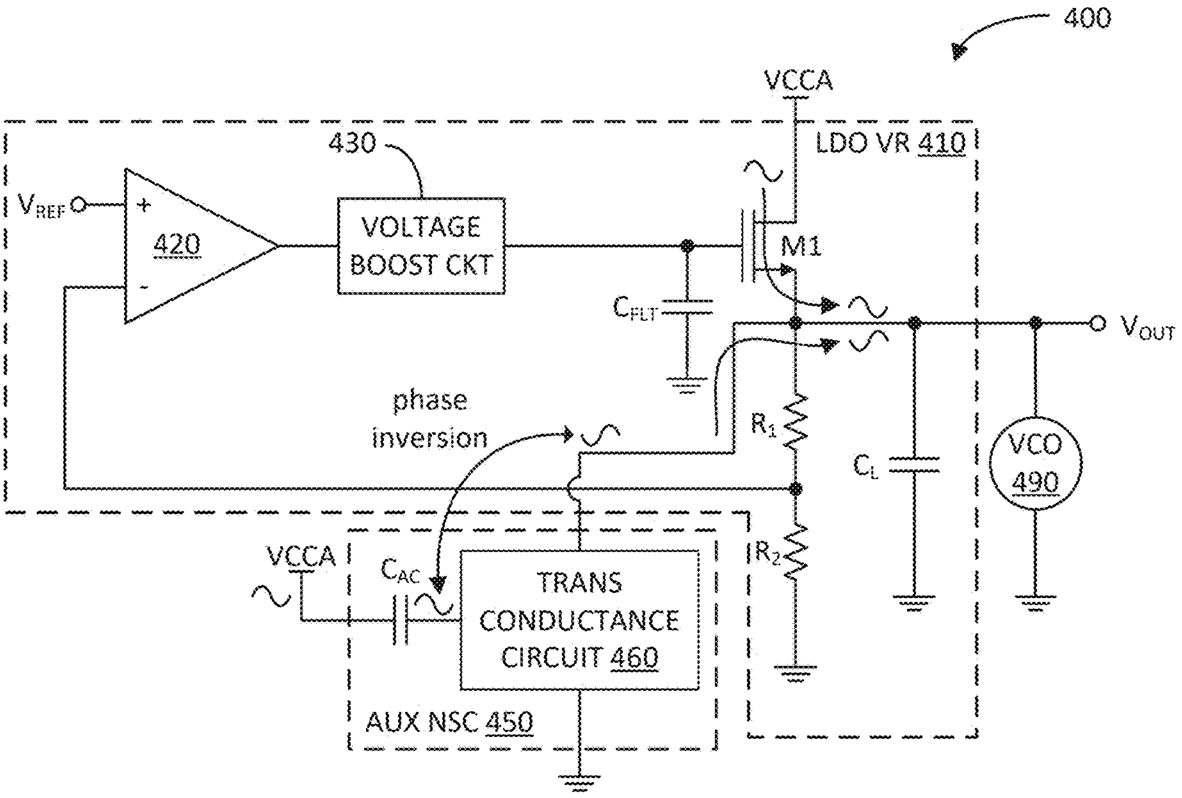
FIG. 4 illustrates a block diagram of another example high power supply rejection ratio (PSRR) low dropout (LDO) voltage regulator in accordance with another aspect of the disclosure.

FIG. 4 illustrates a block diagram of another example high power supply rejection ratio (PSRR) low dropout (LDO) voltage regulator 400 in accordance with another aspect of the disclosure. The high PSRR LDO voltage regulator 400 may be an example implementation of the high PSRR LDO voltage regulator 300 previously discussed.

The high PSRR LDO voltage regulator 400 includes an LDO voltage regulator (VR) 410 similar to LDO voltage regulator 200 previously discussed. That is, the LDO voltage regulator 410 includes a differential amplifier 420, an optional voltage boost circuit 430, a FET M1 (e.g., NFET), a filter capacitor $C_{FLT}$, an optional voltage divider including resistors $R_1$ and $R_2$, and a load capacitor $C_L$ in the same arrangement as the corresponding components in LDO voltage regulator 200. Also, for explanation purposes, a voltage controlled oscillator (VCO) 490, serving as an example load for the LDO voltage regulator 410, may be coupled between the output of the LDO voltage regulator 410 and a lower voltage rail (e.g., ground).

The high PSRR LDO voltage regulator 400 further includes an auxiliary power supply noise suppression circuit (AUX NSC) 450 including a transconductance circuit 460 coupled between the upper voltage rail VCCA and the output of the LDO voltage regulator 410. More specifically, the auxiliary noise suppression circuit 450 includes an alternating current (AC) coupling capacitor CAC coupled between the upper voltage rail VCCA and an input of the transconductance circuit 460, wherein the transconductance circuit 460 includes an output coupled to the output of the LDO voltage regulator 410. The transconductance circuit 460 may also be coupled to the lower voltage rail.

As previously discussed, for frequencies above its regulation bandwidth, the voltage-to-current noise transfer function $NTF_L$ between the upper voltage rail VCCA and the output of the LDO voltage regulator 410 may be modeled or approximated in accordance with the following expression: $g_{m,pass}*C_{GD}/C_{FLT}+1/r_{o,pass}$. The transconductance circuit 460 may have a voltage-to-current noise transfer function $NTF_A$ between the upper voltage rail VCCA and the output of the LDO voltage regulator 410 modeled or approximated by the negative of its transconductance gain $G_M$ (e.g., $NTF_A=-G_M$). Thus, to effectuate substantial noise suppression or reduction at the output of the LDO voltage regulator 410, the auxiliary noise suppression circuit 450 may be configured to have a noise transfer function $NTF_A$ with a phase substantially opposite to the phase of the noise transfer function $NTF_L$ of the LDO voltage regulator 410 (e.g., $NTF_A=-NTF_L\rightarrow G_M=g_{m,pass}*C_{GD}/C_{FLT}+1/r_{o,pass}$). Other than processing power supply noise for noise suppression or reduction purposes, the auxiliary noise suppression circuit 450 may not process any non-noise signal.

Figure 5:
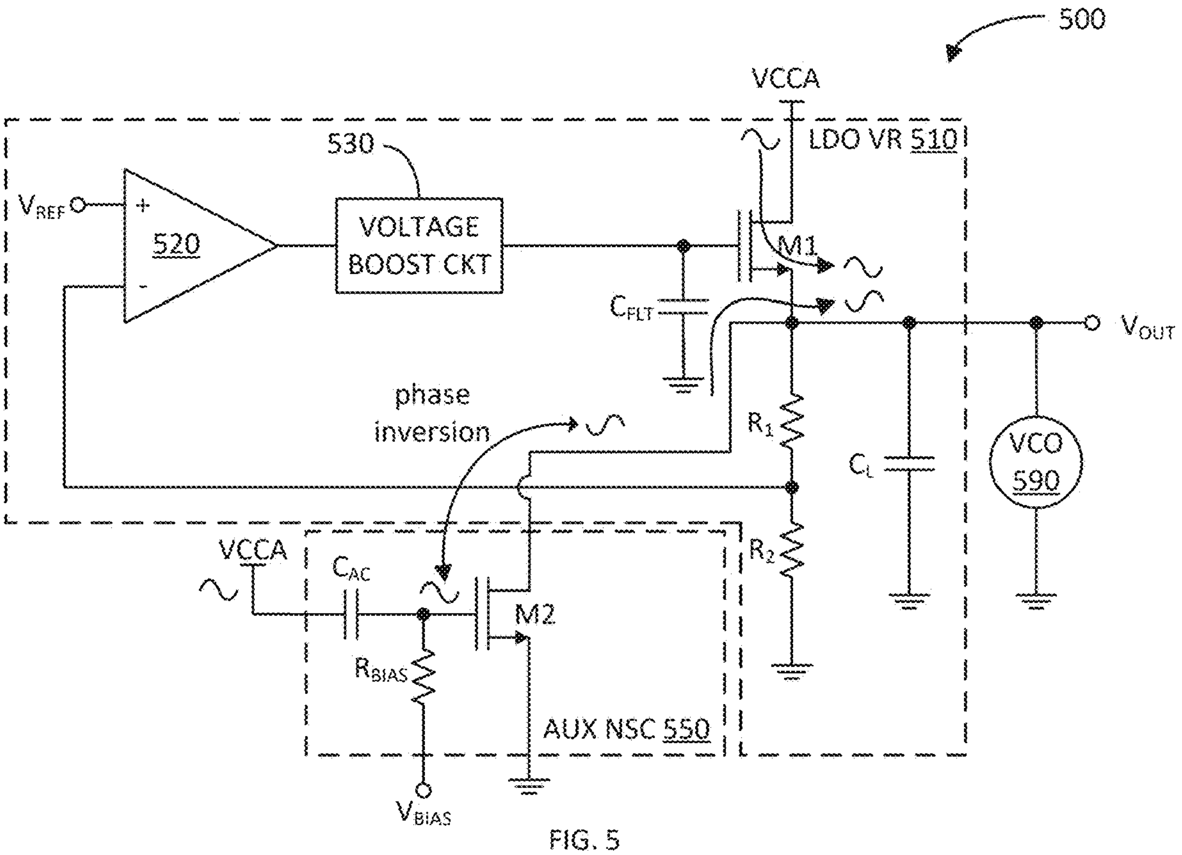
FIG. 5 illustrates a block diagram of another example high power supply rejection ratio (PSRR) low dropout (LDO) voltage regulator in accordance with another aspect of the disclosure.

FIG. 5 illustrates a block diagram of another example high power supply rejection ratio (PSRR) low dropout (LDO) voltage regulator 500 in accordance with another aspect of the disclosure. The high PSRR LDO voltage regulator 500 may be an example implementation of the high PSRR LDO voltage regulator 400 previously discussed.

The high PSRR LDO voltage regulator 500 includes an LDO voltage regulator 510 similar to LDO voltage regulator 410 previously discussed. That is, the LDO voltage regulator 510 includes a differential amplifier 520, an optional voltage boost circuit 530, a FET M1 (e.g., NFET), a filter capacitor $C_{FLT}$, an optional voltage divider including resistors $R_1$ and $R_2$, and a load capacitor $C_L$ in the same arrangement as the corresponding components of LDO voltage regulator 200. Also, for explanation purposes, a voltage controlled oscillator (VCO) 590, serving as an example load for the LDO voltage regulator 510, may be coupled between the output of the LDO voltage regulator 510 and a lower voltage rail (e.g., ground).

The high PSRR LDO voltage regulator 500 further includes an auxiliary power supply noise suppression circuit (AUX NSC) 550 including a field effect transistor (FET) M2 (e.g., an n-channel FET (NFET)) coupled between the output of the LDO voltage regulator 510 and the lower voltage rail. That is, the FET M2 includes a drain coupled to the output of the LDO voltage regulator 510, and a source coupled to the lower voltage rail. Additionally, the auxiliary noise suppression circuit 550 includes an AC coupling capacitor CAC coupled between the upper voltage rail VCCA and the gate of the FET M2, and a bias resistor $R_{BIAS}$ by way a bias voltage Vbias is applied to the gate of the FET M2.

As previously discussed, for frequencies higher than the regulation bandwidth of the LDO voltage regulator 510, the voltage-to-current noise transfer function $NTF_L$ between the upper voltage rail VCCA and the output of the LDO voltage regulator 510 may be modeled or approximated by the following expression: $g_{m,pass}*C_{GD}/C_{FLT}+1/r_{o,pass}$. The FET M2 may be configured to have a voltage-to-current noise transfer function $NTF_A$ between the upper voltage rail VCCA and the output of the LDO voltage regulator 510 modeled or approximated by the negative of its transconductance gain $g_{m,aux}$ (e.g., $NTF_A=-g_{m,aux}$). Thus, to effectuate substantial noise suppression or reduction at the output of the LDO voltage regulator 510, the auxiliary noise suppression circuit 450 may be configured to have a noise transfer function $NTF_A$ with a phase substantially opposite to the phase of the noise transfer function $NTF_L$ of the LDO voltage regulator 510 (e.g., $NTF_A=-NTF_{m,aux} \rightarrow g_{m,aux}=g_{m,pass}*C_{GD}/C_{FLT}+1/r_{o,pass}$). Other than processing power supply noise for noise suppression or reduction purposes, the auxiliary noise suppression circuit 550 may not process any non-noise signal.

Figure 6:
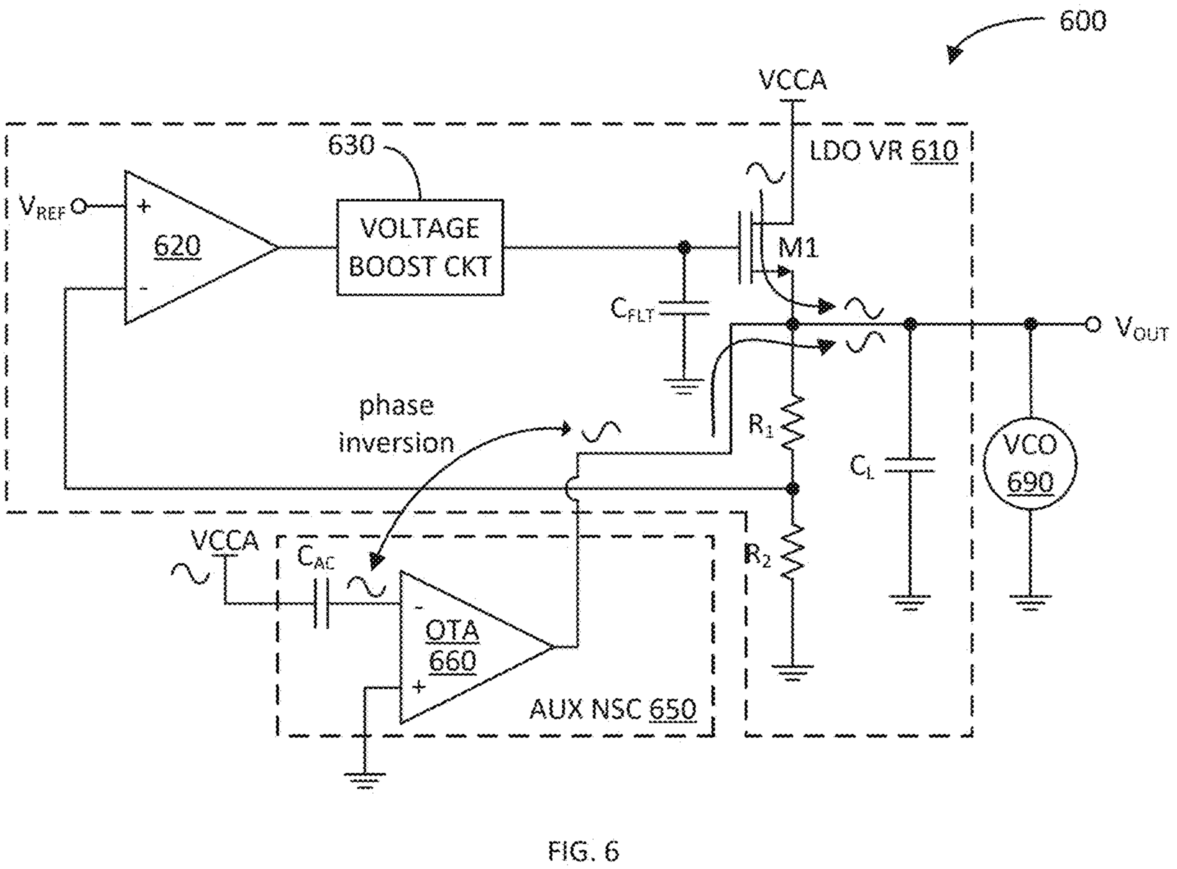
FIG. 6 illustrates a block diagram of another example high power supply rejection ratio (PSRR) low dropout (LDO) voltage regulator in accordance with another aspect of the disclosure.

FIG. 6 illustrates a block diagram of another example high power supply rejection ratio (PSRR) low dropout (LDO) voltage regulator 600 in accordance with another aspect of the disclosure. The high PSRR LDO voltage regulator 600 may be an example implementation of the high PSRR LDO voltage regulator 400 previously discussed.

The high PSRR LDO voltage regulator 600 includes an LDO voltage regulator 610 similar to LDO voltage regulator 410 previously discussed. That is, the LDO voltage regulator 610 includes a differential amplifier 620, an optional voltage boost circuit 630, a FET M1 (e.g., NFET), a filter capacitor $C_{FLT}$, an optional voltage divider including resistors $R_1$ and $R_2$, and a load capacitor $C_L$ in the same arrangement as the corresponding components of LDO voltage regulator 200. Also, for explanation purposes, a voltage controlled oscillator (VCO) 690, serving as an example load for the LDO voltage regulator 610, may be coupled between the output of the LDO voltage regulator 610 and a lower voltage rail (e.g., ground).

The high PSRR LDO voltage regulator 600 further includes an auxiliary power supply noise suppression circuit (AUX NSC) 650 including an operational transconductance amplifier (OTA) 660 including an output coupled to the output of the LDO voltage regulator 610. Additionally, the auxiliary noise suppression circuit 650 includes an AC coupling capacitor CAC coupled between the upper voltage rail VCCA and a first (e.g., negative) input of the OTA 660. The OTA 660 includes a second (e.g., positive) input coupled to the lower voltage rail.

As previously discussed, for frequencies above the regulation bandwidth of the LDO voltage regulator 610, the voltage-to-current noise transfer function $NTF_L$ between the upper voltage rail VCCA and the output of the LDO voltage regulator 610 may be modeled or approximated in accordance with the following expression: $g_{m,pass}*C_{GD}/C_{FLT}+1/r_{o,pass}$. The OTA 660 may have a voltage-to-current noise transfer function $NTF_A$ between the upper voltage rail VCCA and the output of the LDO voltage regulator 610 modeled or approximated by the negative of its transconductance gain G (e.g., $NTF_A=-G_M$). Thus, to effectuate substantial noise suppression or reduction at the output of the LDO voltage regulator 610, the auxiliary noise suppression circuit 650 may be configured to have a noise transfer function $NTF_A$ with a phase substantially opposite to the phase of the noise transfer function $NTF_L$ of the LDO voltage regulator 610 (e.g., $NTF_A=-NTF_L \rightarrow G_M=g_{m,pass}*C_{GD}/C_{FLT}+1/r_{o,pass}$). Other than processing power supply noise for noise suppression or reduction purposes, the auxiliary noise suppression circuit 650 may not process any non-noise signal.

Figure 7A:
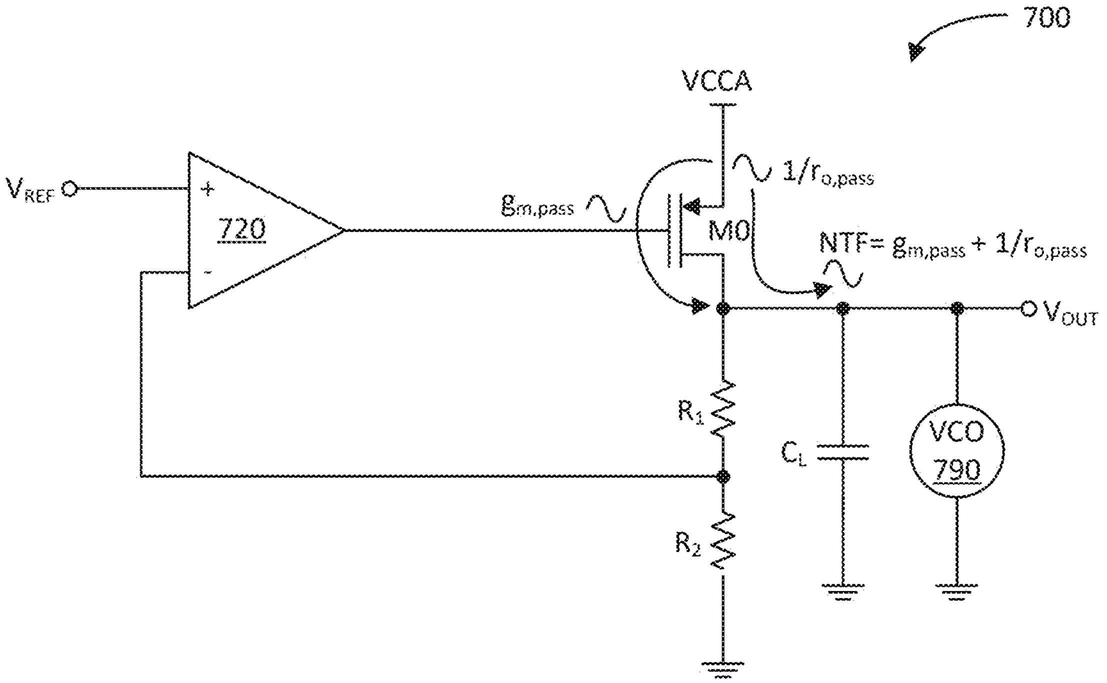
FIG. 7A-7B illustrate block diagrams of example low dropout (LDO) voltage regulators in accordance with another aspect of the disclosure.

FIG. 7A illustrates a block diagram of an example low dropout (LDO) voltage regulator 700 in accordance with another aspect of the disclosure. The LDO voltage regulator 700 is similar to LDO voltage regulator 200 previously discussed, and includes many of the same elements, such as a differential amplifier 720, an optional voltage divider including resistor $R_1$ and $R_2$, and a load capacitor $C_L$ coupled across a VCO 790 serving as an example load for the LDO voltage regulator 700. The LDO voltage regulator 700 differs from the LDO voltage regulator 200 in that it includes a p-channel FET (PFET) M0 instead of the NFET M1. In this regard, the PFET M0 includes a source coupled to the upper voltage rail VCCA and a drain coupled to the output of the LDO voltage regulator 700.

Noise (e.g., high frequency noise beyond the regulation bandwidth of the LDO voltage regulator 700, depicted as a wavy line) from the upper voltage rail VCCA may couple to the output of the LDO voltage regulator 700 via the transconductance gain $g_{m,pass}$ of the FET M0 by modulating a source-to-gate voltage $V_{SG}$ of the FET M0. The voltage-to-current noise transfer function ($NTF_1$) associated with the transconductance gain $g_m$ of the FET M0 may be modeled or approximated in accordance with the following expression: $NTF_1=g_{m,pass}$. Similarly, high frequency noise (e.g., depicted as a wavy line) from the upper voltage rail VCCA may also couple to the output of the LDO voltage regulator 700 via the output resistance $r_{o,pass}$ of the FET M0. The voltage-to-current noise transfer function ($NTF_2$) associated with the output resistance $r_{o,pass}$ of the FET M0 may be modeled or approximated in accordance with the following expression: $NTF_2=1/r_{o,pass}$. Thus, the total voltage-to-current NTF for the LDO voltage regulator 700 may be modeled or approximated in accordance with the following expression: $NTF=NTF_1+NTF_2=g_{m,pass}+1/r_{o,pass}$.

Figure 7B:
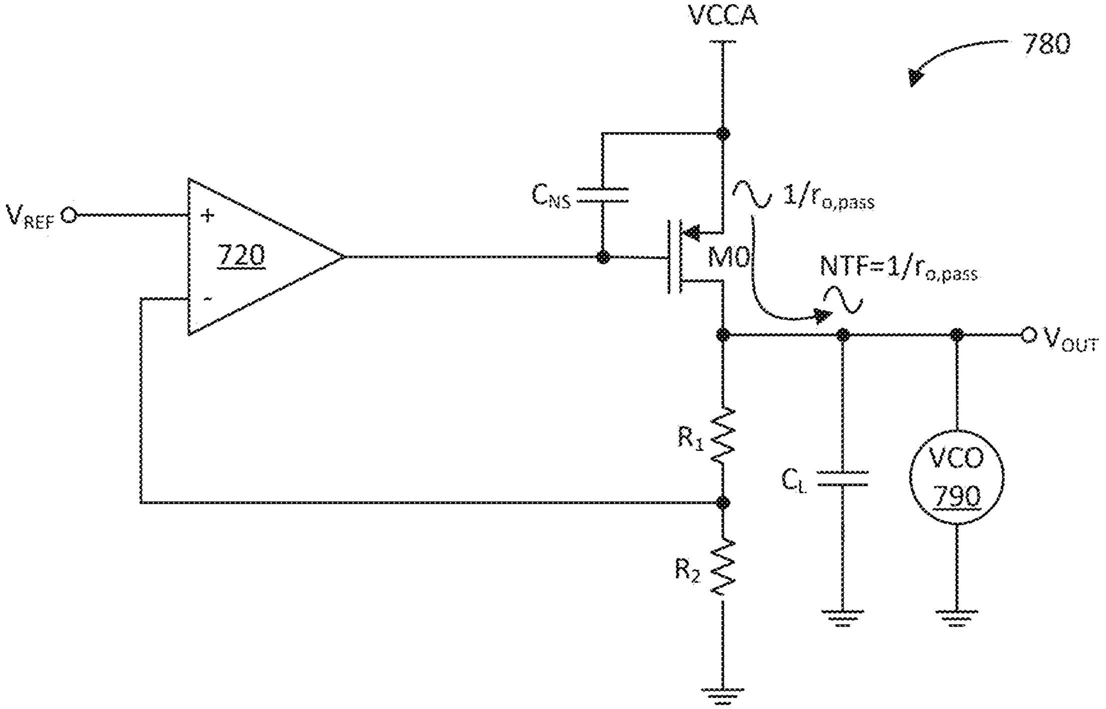

FIG. 7B illustrates a block diagram of an example low dropout (LDO) voltage regulator 780 in accordance with another aspect of the disclosure. The LDO voltage regulator 780 may be a variation of LDO voltage regulator 700. In particular, the LDO voltage regulator 780 further includes a noise suppression capacitor $C_{NS}$ coupled between the upper voltage rail VCCA and the gate of the FET M0. The noise suppression capacitor $C_{NS}$ reduces the noise contribution associated with modulating the source-to-gate voltage $V_{SG}$ of the FET M0 or the transconductance gain $g_m$ of the FET M0. Accordingly, the noise transfer function $NTF1=g_{m,pass}$ may be substantially eliminated using the noise suppression capacitor $C_{NS}$ resulting in a total NTF for the LDO voltage regulator 780 being the noise contribution associated with the output resistance $r_{o,pass}$ of the FET M0. That is, the total voltage-to-current NTF for the LDO voltage regulator 780 may be modeled or approximated in accordance with the following expression: $NTF=1/r_{o,pass}$.

Figure 8:
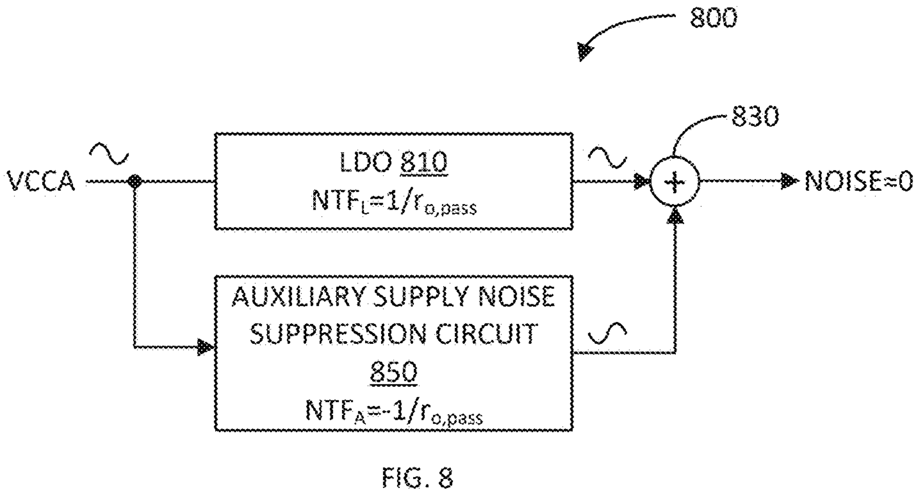
FIG. 8 illustrates a block diagram of another example high power supply rejection ratio (PSRR) low dropout (LDO) voltage regulator in accordance with another aspect of the disclosure.

FIG. 8 illustrates a block diagram of an example high power supply rejection ratio (PSRR) low dropout (LDO) voltage regulator 800 in accordance with another aspect of the disclosure. The high PSRR LDO voltage regulator 800 includes an LDO voltage regulator 810, such as the LDO voltage regulator 780 previously discussed. The LDO voltage regulator 810 may be coupled between a voltage rail VCCA and an output 830, represented as a summing node as discussed further herein. As previously discussed, for frequencies beyond its regulation bandwidth, the LDO voltage regulator 810 may have a voltage-to-current noise transfer function ($NTF_L$) given by the following expression: $NTF_L=1/r_{o,pass}$ between the voltage rail VCCA and the output 830.

The high PSRR LDO voltage regulator 800 further includes an auxiliary power supply noise suppression circuit 850 coupled between the voltage rail VCCA and the output 830 of the high PSRR LDO voltage regulator 800. The auxiliary noise suppression circuit 850 is configured to have a voltage-to-current noise transfer function ($NTF_A$) with a phase substantially opposite to the phase of the $NTF_L$ of the LDO voltage regulator 810 (e.g., $NTF_A=-NTF_L=-1/r_{o,pass}$). Accordingly, the respective noise contributions from the LDO voltage regulator 810 and the auxiliary noise suppression circuit 850 sum at the output 830 of the high PSRR LDO voltage regulator 800, where noise suppression or reduction occurs: noise at output$=NTF_L+NTF_A=NTF_L-NTF_L\approx$zero (0).

In this example, the $NTF_A$ of the auxiliary noise suppression circuit 850 has a phase substantially opposite to the phase of the $NTF_L$ of the LDO voltage regulator 810, and the output node 830 sums the noise contributions of the auxiliary noise suppression circuit 850 and the LDO voltage regulator 810. However, equivalently, the $NTF_A$ of the auxiliary noise suppression circuit 850 may have substantially the same phase as the phase of the $NTF_L$ as the LDO voltage regulator 810 (e.g., $NTF_A\approx NTF_L$), where the output node may be configured to subtract the noise contributions of the auxiliary noise suppression circuit 850 from the LDO voltage regulator 810 to effectuate noise suppression or reduction.

Figure 9:
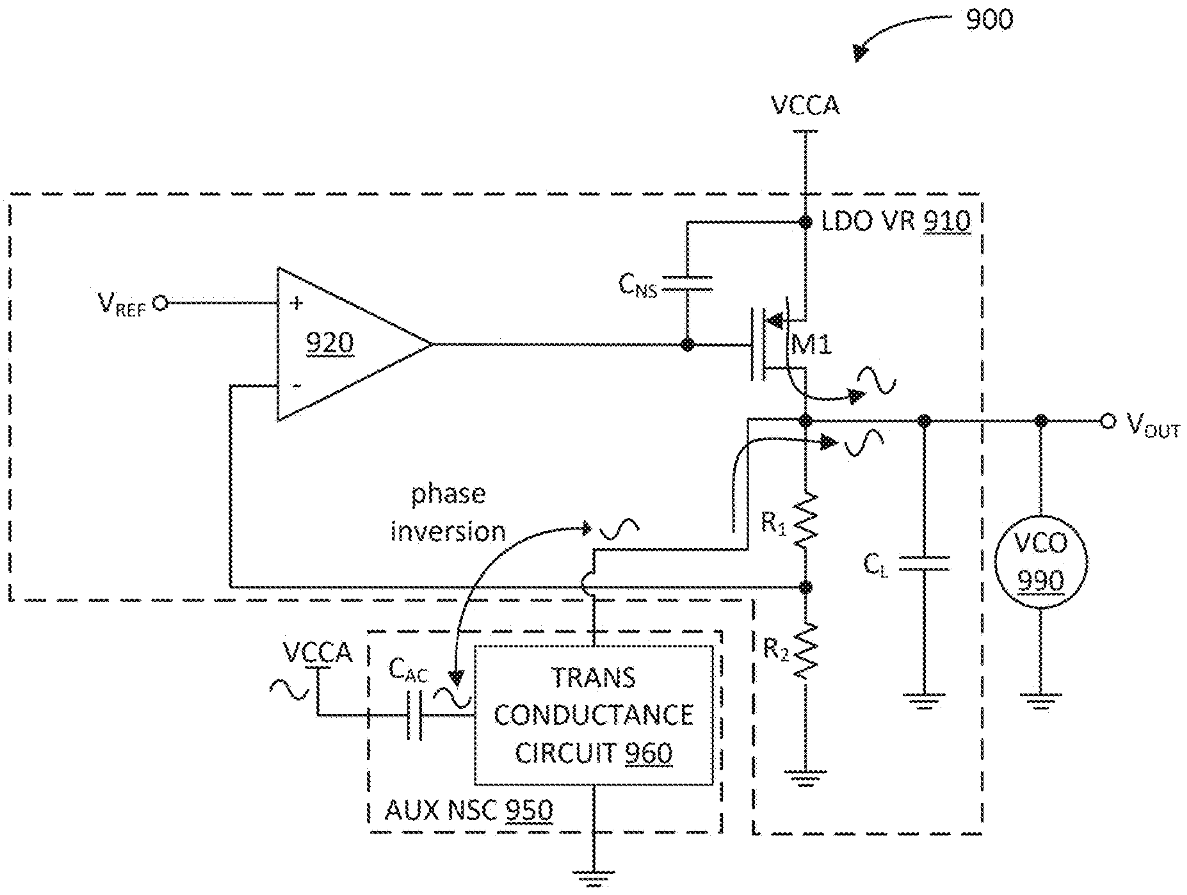
FIG. 9 illustrates a block diagram of another example high power supply rejection ratio (PSRR) low dropout (LDO) voltage regulator in accordance with another aspect of the disclosure.

FIG. 9 illustrates a block diagram of another example high power supply rejection ratio (PSRR) low dropout (LDO) voltage regulator 900 in accordance with another aspect of the disclosure. The high PSRR LDO voltage regulator 900 may be an example implementation of the high PSRR LDO voltage regulator 800 previously discussed.

The high PSRR LDO voltage regulator 900 includes an LDO voltage regulator 910 similar to LDO voltage regulator 780 previously discussed. That is, the LDO voltage regulator 910 includes a differential amplifier 920, a FET M0 (e.g., PFET), a noise suppression capacitor $C_{NS}$, an optional voltage divider including resistors $R_1$ and $R_2$, and a load capacitor $C_L$ in the same arrangement as the corresponding components in LDO voltage regulator 780. Also, for explanation purposes, a voltage controlled oscillator (VCO) 990, serving as an example load for the LDO voltage regulator 910, may be coupled between the output of the LDO voltage regulator 910 and a lower voltage rail (e.g., ground).

The high PSRR LDO voltage regulator 900 further includes an auxiliary power supply noise suppression circuit (AUX NSC) 950 including a transconductance circuit 960 including an output coupled to the output of the LDO voltage regulator 910. Additionally, the auxiliary noise suppression circuit 950 includes an AC coupling capacitor CAC coupled between the upper voltage rail VCCA and an input of the transconductance circuit 960. The transconductance circuit 960 may also be coupled to the lower voltage rail.

As previously discussed, for frequencies higher than the regulation bandwidth of the LDO voltage regulator 910, the voltage-to-current noise transfer function $NTF_L$ between the upper voltage rail and the output of the LDO voltage regulator 910 may be modeled or approximated in accordance with the following expression: $1/r_{o,pass}$. The transconductance circuit 960 may be configured to have a voltage-to-current noise transfer function $NTF_A$ between the upper voltage rail VCCA and the output of the LDO voltage regulator 910 modeled or approximated by the negative of its transconductance gain $G_M$ (e.g., $NTF_A=-G_M$). Thus, to effectuate substantial noise suppression or reduction at the output of the LDO voltage regulator 910, the auxiliary noise suppression circuit 950 may be configured to have a voltage-to-current noise transfer function $NTF_A$ with a phase substantially opposite to the phase of the noise transfer function $NTF_L$ of the LDO voltage regulator 910 (e.g., $NTF_A=-NTF_L\rightarrow G_M=1/r_{o,pass}$). Other than processing power supply noise for noise suppression or reduction purposes, the auxiliary noise suppression circuit 950 may not process any non-noise signal.

Figure 10:
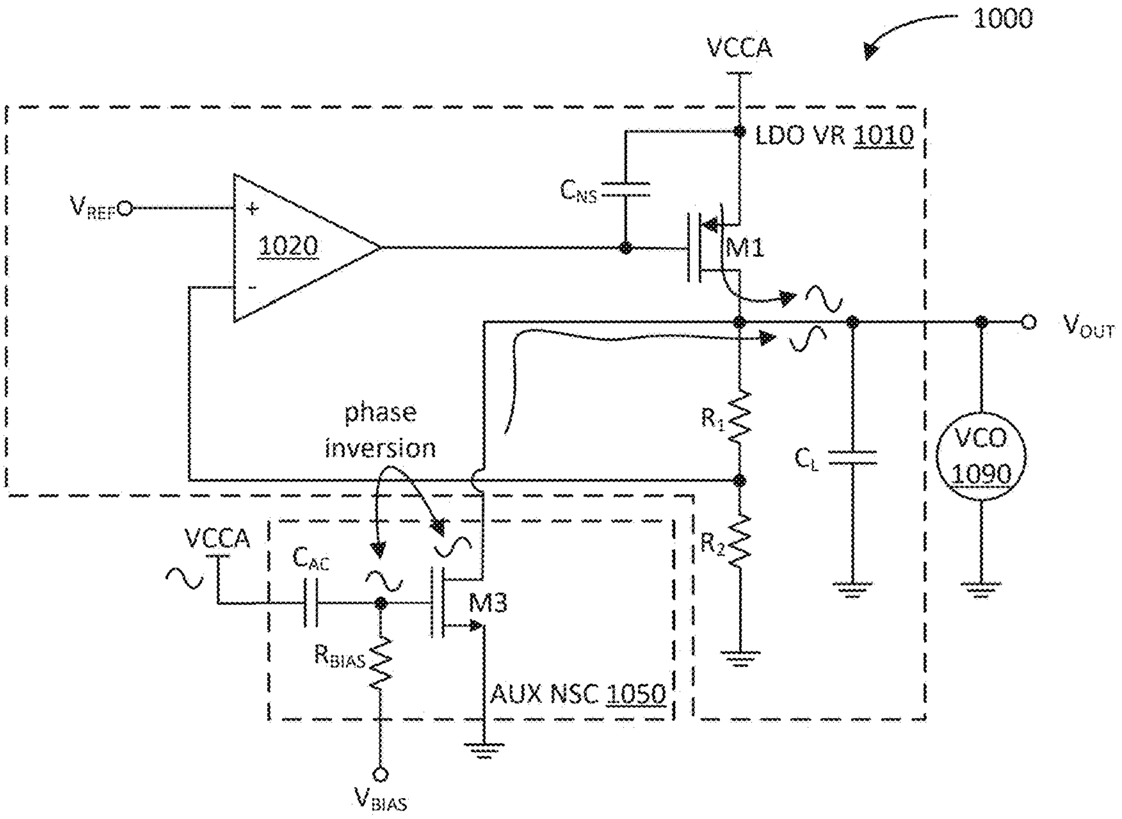
FIG. 10 illustrates a block diagram of another example high power supply rejection ratio (PSRR) low dropout (LDO) voltage regulator in accordance with another aspect of the disclosure.

FIG. 10 illustrates a block diagram of another example high power supply rejection ratio (PSRR) low dropout (LDO) voltage regulator 1000 in accordance with another aspect of the disclosure. The high PSRR LDO voltage regulator 1000 may be an example implementation of the high PSRR LDO voltage regulator 800 previously discussed.

The high PSRR LDO voltage regulator 1000 includes an LDO voltage regulator 1010 similar to LDO voltage regulator 780 previously discussed. That is, the LDO voltage regulator 1010 includes a differential amplifier 1020, a FET M0 (e.g., PFET), a noise suppression capacitor $C_{NS}$, an optional voltage divider including resistors $R_1$ and $R_2$, and a load capacitor $C_L$ in the same arrangement as the corresponding components of LDO voltage regulator 780. Also, for explanation purposes, a voltage controlled oscillator (VCO) 1090, serving as an example load for the LDO voltage regulator 1010, may be coupled between the output of the LDO voltage regulator 1010 and a lower voltage rail (e.g., ground).

The high PSRR LDO voltage regulator 1000 further includes an auxiliary power supply noise suppression circuit (AUX NSC) 1050 including a field effect transistor (FET) M3 (e.g., an n-channel FET (NFET)) coupled between the output of the LDO voltage regulator 1010 and the lower voltage rail. That is, the FET M3 includes a drain coupled to the output of the LDO voltage regulator 1010, and a source coupled to the lower voltage rail. Additionally, the auxiliary noise suppression circuit 1050 includes an AC coupling capacitor CAC coupled between the upper voltage rail VCCA and the gate of the FET M3, and a bias resistor $R_{BIAS}$ by way a bias voltage $V_{BIAS}$ is applied to the gate of the FET M3.

As previously discussed, for frequencies higher than the regulation bandwidth of the LDO voltage regulator 1010, the voltage-to-current noise transfer function $NTF_L$ between the upper voltage rail VCCA and the output of the LDO voltage regulator 1010 may be modeled or approximated by the following expression: $1/r_{o,pass}$ The FET M3 may be configured to have a voltage-to-current noise transfer function $NTF_A$ between the upper voltage rail VCCA and the output of the LDO voltage regulator 1010 modeled or approximated by the negative of its transconductance gain $g_{m,aux}$ (e.g., $NTF_A=-g_{m,aux}$). Thus, to effectuate substantial noise suppression or reduction at the output of the LDO voltage regulator 1010, the auxiliary noise suppression circuit 1050 may be configured to have a noise transfer function $NTF_A$ with a phase substantially opposite to the phase of the noise transfer function $NTF_L$ of the LDO voltage regulator 1010 (e.g., $NTF_A=-NTF_L \rightarrow g_{m,aux}=1/r_{o,pass}$). Other than processing power supply noise for noise suppression or reduction purposes, the auxiliary noise suppression circuit 1050 may not process any non-noise signal.

Figure 11:
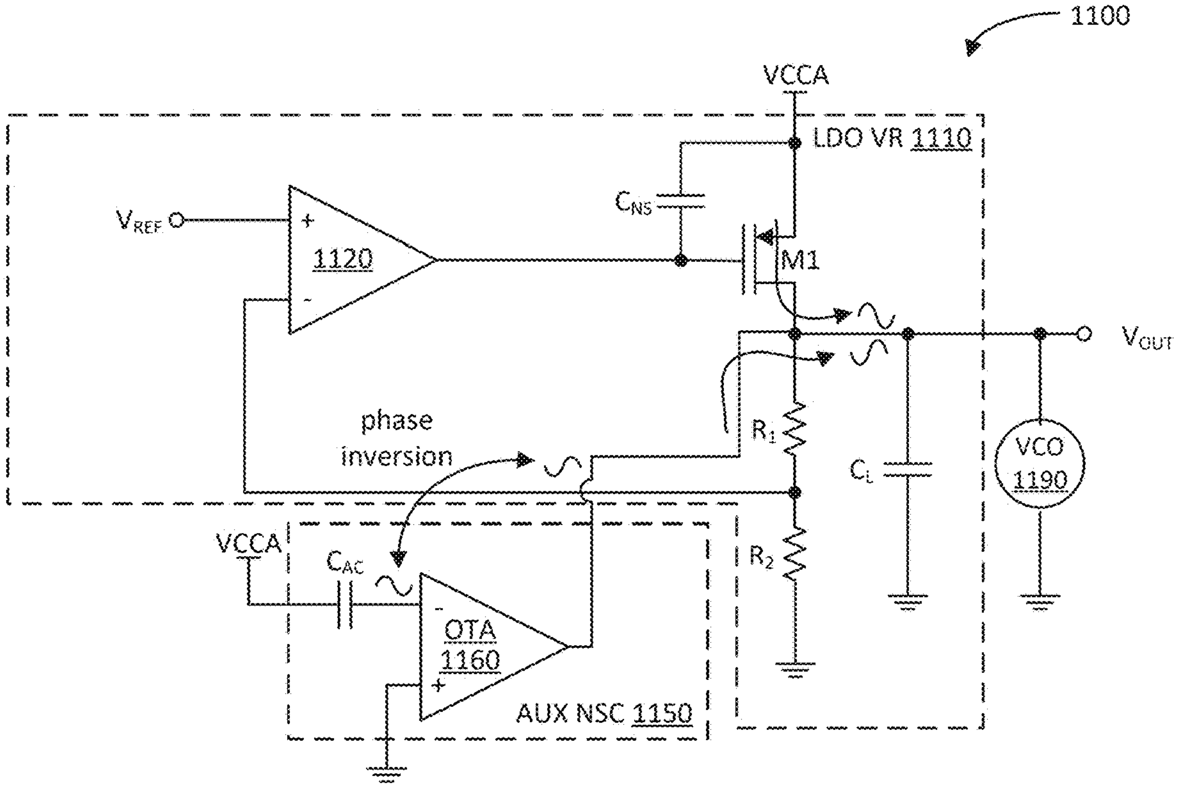
FIG. 11 illustrates a block diagram of another example high power supply rejection ratio (PSRR) low dropout (LDO) voltage regulator in accordance with another aspect of the disclosure.

FIG. 11 illustrates a block diagram of another example high power supply rejection ratio (PSRR) low dropout (LDO) voltage regulator 1100 in accordance with another aspect of the disclosure. The high PSRR LDO voltage regulator 1100 may be an example implementation of the high PSRR LDO voltage regulator 800 previously discussed.

The high PSRR LDO voltage regulator 1100 includes an LDO voltage regulator 1110 similar to LDO voltage regulator 780 previously discussed. That is, the LDO voltage regulator 1110 includes a differential amplifier 1120, a FET M0 (e.g., PFET), a noise suppression capacitor $C_{NS}$, an optional voltage divider including resistors $R_1$ and $R_2$, and a load capacitor $C_L$ in the same arrangement as the corresponding components of LDO voltage regulator 780. Also, for explanation purposes, a voltage controlled oscillator (VCO) 1190, serving as an example load for the LDO voltage regulator 1110, may be coupled between the output of the LDO voltage regulator 1110 and a lower voltage rail (e.g., ground).

The high PSRR LDO voltage regulator 1100 further includes an auxiliary power supply noise suppression circuit (AUX NSC) 1150 including an operational transconductance amplifier (OTA) 1160 including an output coupled to the output of the LDO voltage regulator 1110. Additionally, the auxiliary noise suppression circuit 1150 includes an AC coupling capacitor CAC coupled between the upper voltage rail VCCA and a first (e.g., negative) input of the OTA 1160. The OTA 1160 includes a second (e.g., positive) input coupled to the lower voltage rail.

As previously discussed, for frequencies higher than the regulation bandwidth of the LDO voltage regulator 1110, the voltage-to-current noise transfer function $NTF_L$ between the upper voltage rail VCCA and the output of the LDO voltage regulator 1110 may be modeled or approximated in accordance with the following expression: $1/r_{o,pass}$. The OTA 1160 may have a voltage-to-current noise transfer function $NTF_A$ between the upper voltage rail VCCA and the output of the LDO voltage regulator 1110 modeled or approximated by the negative of its transconductance gain GM (e.g., $NTF_A=-G_M$). Thus, to effectuate substantial noise suppression or reduction at the output of the LDO voltage regulator 1110, the auxiliary noise suppression circuit 1150 may be configured to have a noise transfer function $NTF_A$ with a phase substantially opposite to the phase of the noise transfer function $NTF_L$ of the LDO voltage regulator 1110 (e.g., $NTF_A=-NTF_L \rightarrow G_M=1/r_{o,pass}$). Other than processing power supply noise for noise suppression or reduction purposes, the auxiliary noise suppression circuit 1150 may not process any non-noise signal.

Figure 12:
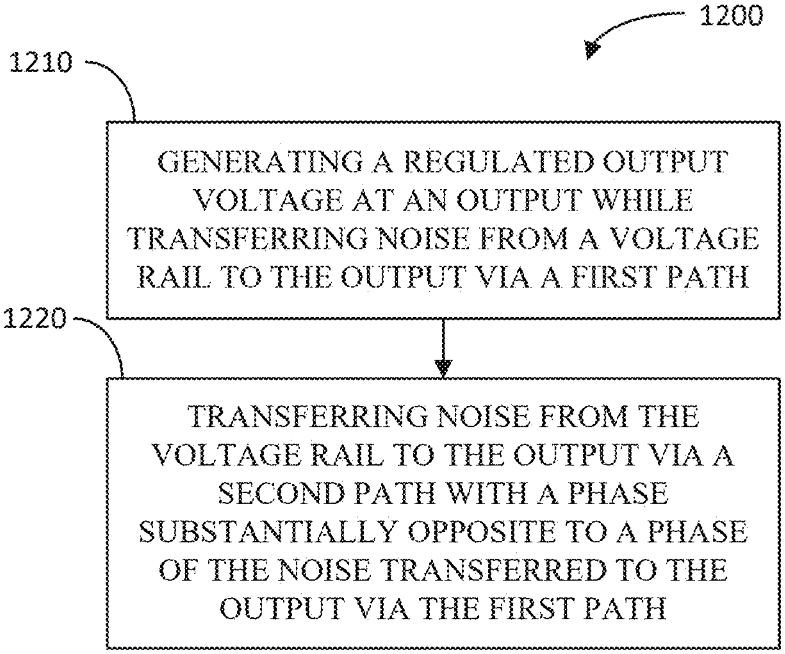
FIG. 12 illustrates a flow diagram of an example method of suppressing power supply noise at an output of an example low dropout (LDO) voltage regulator in accordance with another aspect of the disclosure.

FIG. 12 illustrates a flow diagram of an example method 1200 of suppressing power supply noise at an output of an example low dropout (LDO) voltage regulator in accordance with another aspect of the disclosure. The method 1200 includes generating a regulated output voltage at an output while transferring noise from a voltage rail to the output via a first path (block 1210). Examples of means for generating a regulated output voltage at an output while transferring noise from a voltage rail to the output via a first path include any of the LDO voltage regulators described herein.

The method 1200 further includes transferring noise from the voltage rail to the output via a second path with a phase substantially opposite to a phase of the noise transferred to the output via the first path (block 1220). Examples of means for transferring noise from the voltage rail to the output via a second path with a phase substantially opposite to a phase of the noise transferred to the output via the first path include any of the auxiliary power supply noise suppression circuits described herein.

The following provides an overview of aspects of the present disclosure:

Aspect 1: An apparatus, including: an upper voltage rail; a lower voltage rail; a low dropout (LDO) voltage regulator configured to generate a regulated output voltage at an output coupled between the upper voltage rail and the lower voltage rail while transferring noise from the upper voltage rail to the output; and an auxiliary noise suppression circuit configured to transfer noise from the upper voltage rail to the output of the LDO voltage regulator with a phase substantially opposite to a phase of the noise transferred to the output by the LDO voltage regulator such that noise suppression or reduction occurs at the output of the LDO voltage regulator.

Aspect 2: The apparatus of aspect 1, wherein the LDO voltage regulator comprises a first field effect transistor (FET) coupled between the upper voltage rail and the output of the LDO voltage regulator.

Aspect 3: The apparatus of aspect 2, wherein the LDO voltage regulator transfers the noise from the upper voltage rail to the output in accordance with a first noise transfer function that is a function of an output resistance of the first FET.

Aspect 4: The apparatus of aspect 3, wherein the auxiliary noise suppression circuit comprises: a transconductance circuit including an output coupled to the output of the LDO voltage regulator; and an alternating current (AC) coupling capacitor coupled between the upper voltage rail and an input to the transconductance circuit, wherein the transconductance circuit is configured to transfer the noise from the input to the output of the transconductance circuit in accordance with a second transfer function that is a function of a transconductance gain of the transconductance circuit.

Aspect 5: The apparatus of aspect 3 or 4, wherein the auxiliary noise suppression circuit comprises: a second field effect transistor (FET) coupled between the output of the LDO voltage regulator and the lower voltage rail; and an alternating current (AC) coupling capacitor coupled between the upper voltage rail and a gate of the second FET, wherein the second FET is configured to transfer the noise from the gate of the second FET to the output of the LDO voltage regulator in accordance with a second transfer function that is a function of a transconductance gain of the second FET.

Aspect 6: The apparatus of aspect 5, wherein the auxiliary noise suppression circuit further comprises a resistor through which a bias voltage is applied to the gate of the second FET.

Aspect 7: The apparatus of aspect 5 or 6, wherein the second FET comprises an n-channel FET.

Aspect 8: The apparatus of aspect 3 or 4, wherein the auxiliary noise suppression circuit comprises: an operational transconductance amplifier (OTA) including an output coupled to the output of the LDO voltage regulator; and an alternating current (AC) coupling capacitor coupled between the upper voltage rail and an input to the OTA, wherein the OTA is configured to transfer the noise from the input to the output of the OTA in accordance with a second transfer function that is a function of a transconductance gain of the OTA.

Aspect 9: The apparatus of any one of aspects 3-8, wherein the first FET comprises a p-channel FET.

Aspect 10: The apparatus of any one of aspects 2-9, wherein the LDO voltage regulator transfers the noise from the upper voltage rail to the output in accordance with a first noise transfer function that is a function of a transconductance gain of the first FET.

Aspect 11: The apparatus of aspect 10, wherein the first FET comprises an n-channel FET.

Aspect 12: The apparatus of any one of aspects 1-11, wherein the LDO voltage regulator comprises: a differential amplifier including a first input configured to receive a reference voltage; and a first field effect transistor (FET) coupled between the upper voltage rail and the output of the LDO voltage regulator, wherein an output of the differential amplifier is coupled to a gate of the first FET.

Aspect 13: The apparatus of aspect 12, wherein the first FET comprises an n-channel FET (NFET).

Aspect 14: The apparatus of aspect 13, wherein the LDO voltage regulator comprises a voltage boosting circuit coupled between the output of the differential amplifier and the gate of the NFET.

Aspect 15: The apparatus of aspect 12, wherein the first FET comprises a p-channel FET (PFET), wherein the LDO voltage regulator further comprises a capacitor coupled between the upper voltage rail and a gate of the PFET.

Aspect 16: The apparatus of any one of aspects 12-15, wherein the auxiliary noise suppression circuit comprises: a transconductance circuit including an output coupled to the output of the LDO voltage regulator; and an alternating current (AC) coupling capacitor coupled between the upper voltage rail and an input to the transconductance circuit.

Aspect 17: The apparatus of any one of aspects 12-15, wherein the auxiliary noise suppression circuit comprises: a second field effect transistor (FET) coupled between the output of the LDO voltage regulator and the lower voltage rail; and an alternating current (AC) coupling capacitor coupled between the upper voltage rail and a gate of the second FET.

Aspect 18: The apparatus of any one of aspects 12-15, wherein the auxiliary noise suppression circuit comprises: an operational transconductance amplifier (OTA) including an output coupled to the output of the LDO voltage regulator; and an alternating current (AC) coupling capacitor coupled between the upper voltage rail and an input to the OTA.

Aspect 19: An apparatus, comprising: an upper voltage rail; a lower voltage rail; a low dropout (LDO) voltage regulator configured to generate a regulated output voltage at an output coupled between the upper voltage rail and the lower voltage rail while transferring noise from the upper voltage rail to the output; and an auxiliary noise suppression circuit configured to transfer noise from the upper voltage rail to the output of the LDO voltage regulator such that noise suppression or reduction occurs at the output of the LDO voltage regulator.

Aspect 20: A method, comprising: generating a regulated output voltage at an output while transferring noise from a voltage rail to the output via a first path; and transferring noise from the voltage rail to the output via a second path with a phase substantially opposite to a phase of the noise transferred to the output via the first path.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. An apparatus, comprising:
- an upper voltage rail;
- a lower voltage rail;
- a low dropout (LDO) voltage regulator configured to generate a regulated output voltage at an output coupled between the upper voltage rail and the lower voltage rail while transferring noise from the upper voltage rail to the output, wherein the LDO voltage regulator comprises a first field effect transistor (FET) coupled between the upper voltage rail and the output of the LDO voltage regulator, and wherein the LDO voltage regulator transfers the noise from the upper voltage rail to the output in accordance with a first noise transfer function that is a function of an output resistance of the first FET; and
- an auxiliary noise suppression circuit configured to transfer noise from the upper voltage rail to the output of the LDO voltage regulator with a phase substantially opposite to a phase of the noise transferred to the output by the LDO voltage regulator such that noise suppression or reduction occurs at the output of the LDO voltage regulator, wherein the auxiliary noise suppression circuit comprises
  - an operational transconductance amplifier (OTA) including an output coupled to the output of the LDO voltage regulator; and
  - an alternating current (AC) coupling capacitor coupled between the upper voltage rail and an input to the OTA, wherein the OTA is configured to transfer the noise from the input to the output of the OTA in accordance with a second transfer function that is a function of a transconductance gain of the OTA.

2. The apparatus of claim 1, wherein the first FET comprises a p-channel FET.

3. The apparatus of claim 1, wherein the first FET comprises an n-channel FET.

4. The apparatus of claim 1, wherein the LDO voltage regulator comprises:
- a differential amplifier including a first input configured to receive a reference voltage,
- wherein an output of the differential amplifier is coupled to a gate of the first FET.

5. The apparatus of claim 4, wherein the first FET comprises an n-channel FET (NFET).

6. The apparatus of claim 5, wherein the LDO voltage regulator comprises a voltage boost circuit coupled between the output of the differential amplifier and a gate of the NFET.

7. The apparatus of claim 4, wherein the first FET comprises a p-channel FET (PFET), wherein the LDO voltage regulator further comprises a capacitor coupled between the upper voltage rail and a gate of the PFET.

8. An apparatus, comprises:

an upper voltage rail;

a lower voltage rail;

a low dropout (LDO) voltage regulator configured to generate a regulated output voltage at an output coupled between the upper voltage rail and the lower voltage rail while transferring noise from the upper voltage rail to the output, wherein the LDO voltage regulator comprises a differential amplifier including a first input configured to receive a reference voltage, and a first field effect transistor (FET) coupled between the upper voltage rail and the output of the LDO voltage regulator, wherein an output of the differential amplifier is coupled to a gate of the first FET; and an auxiliary noise suppression circuit configured to transfer noise from the upper voltage rail to the output of the LDO voltage regulator with a phase substantially opposite to a phase of the noise transferred to the output by the LDO voltage regulator such that noise suppression or reduction occurs at the output of the LDO voltage regulator, wherein the auxiliary noise suppression circuit comprises:

an operational transconductance amplifier (OTA) including an output coupled to the output of the LDO voltage regulator; and an alternating current (AC) coupling capacitor coupled between the upper voltage rail and an input to the OTA.

9. The apparatus of claim 8, wherein the first FET comprises an n-channel FET (NFET).

10. The apparatus of claim 9, wherein the LDO voltage regulator further comprises a voltage boost circuit coupled between the output of the differential amplifier and a gate of the NFET.

11. The apparatus of claim 8, wherein the first FET comprises a p-channel FET (PFET), wherein the LDO voltage regulator further comprises a capacitor coupled between the upper voltage rail and a gate of the PFET.

* * * * *